(12) United States Patent
Sun (10) Patent No.: US 12,339,791 B2
(45) Date of Patent: Jun. 24, 2025

(54) METHOD FOR WRITING DATA FROM AXI BUS TO OPB AND METHOD FOR READING DATA FROM AXI BUS TO OPB

(71) Applicant: INSPUR SUZHOU INTELLIGENT TECHNOLOGY CO., LTD., Jiangsu (CN)

(72) Inventor: Xu Sun, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/258,447

(22) PCT Filed: Oct. 29, 2021

(86) PCT No.: PCT/CN2021/127515
§ 371 (c)(1),
(2) Date: Jun. 20, 2023

(87) PCT Pub. No.: WO2023/284169
PCT Pub. Date: Jan. 19, 2023

(65) Prior Publication Data
US 2024/0028525 A1    Jan. 25, 2024

(30) Foreign Application Priority Data
Jul. 15, 2021    (CN) .......................... 202110798145.0

(51) Int. Cl.
*G06F 13/12* (2006.01)
*G06F 12/02* (2006.01)
(Continued)

(52) U.S. Cl.
CPC ........ *G06F 13/126* (2013.01); *G06F 12/0238* (2013.01); *G06F 13/4221* (2013.01)

(58) Field of Classification Search
CPC .......................... G06F 3/1204; G06F 13/1668
See application file for complete search history.

(56) References Cited

U.S. PATENT DOCUMENTS 10,275,259 B1 * 4/2019 Jain .................. G06F 9/4411
11,847,243 B2 * 12/2023 Sakata .............. G06F 3/0656
(Continued)

FOREIGN PATENT DOCUMENTS

CN    1279789 A    1/2001
CN    102004709 A    4/2011
(Continued)

OTHER PUBLICATIONS

Search report for International Application No. PCT/CN2021/127515 mailed on Mar. 29, 2022.
(Continued)

*Primary Examiner* — Getente A Yimer
(74) *Attorney, Agent, or Firm* — Dennemeyer & Associates LLC (57) ABSTRACT

Disclosed are a method and apparatus for writing data from an Advanced extensible Interface (AXI) bus to an On-chip Peripheral Bus (OPB), a method and apparatus for reading the data from the AXI bus to the OPB, an electronic device and a non-transitory computer readable storage medium. The method for writing the data includes the following steps: receiving AXI write data sent by the AXI bus (S101); storing the AXI write data into an AXI write cache (S102); performing timing conversion from an AXI bus protocol to an OPB protocol on the AXI write data to obtain OPB write data (S103); and exporting the OPB write data from the AXI write cache to the OPB (S104). By applying the method for writing the data, data interaction between the AXI bus and the OPB is completed, the cost is reduced, and the project development efficiency is improved.

11 Claims, 9 Drawing Sheets

(51) Int. Cl.
    *G06F 13/42*         (2006.01)
    *G06F 30/398*      (2020.01)

(56)                  References Cited

U.S. PATENT DOCUMENTS

| | | | |
|---|---|---|---|
| 12,019,565 B2* | 6/2024 | Brahmadathan | G06F 13/1673 |
| 2011/0055439 A1 | 3/2011 | Chen et al. | |
| 2011/0106991 A1 | 5/2011 | Kawahito | |
| 2012/0047306 A1 | 2/2012 | Mitsubayashi | |
| 2012/0166730 A1* | 6/2012 | Gehman | G06F 13/1668 |
| | | | 710/305 |
| 2020/0042257 A1* | 2/2020 | Wang | G06F 3/1204 |

FOREIGN PATENT DOCUMENTS

| | | | |
|---|---|---|---|
| CN | 102103565 A | 6/2011 | |
| CN | 102169470 A | 8/2011 | |
| CN | 102508808 A | 6/2012 | |
| CN | 105005546 A | 10/2015 | |
| CN | 106326175 A | 1/2017 | |
| CN | 108255769 A | 7/2018 | |
| CN | 109828941 A | 5/2019 | |
| CN | 110659236 A | 1/2020 | |
| CN | 112035389 A | 12/2020 | |
| CN | 112306924 A | 2/2021 | |
| CN | 113254368 A | 8/2021 | |

OTHER PUBLICATIONS

Search report 1 for Chinese application 202110798145.0, filed Jul. 15, 2021.
Search report 2 for Chinese application 202110798145.0, filed Jul. 15, 2021.

* cited by examiner

Fig. 9

METHOD FOR WRITING DATA FROM AXI BUS TO OPB AND METHOD FOR READING DATA FROM AXI BUS TO OPB

CROSS-REFERENCE TO RELATED APPLICATIONS

This is a 35 U.S.C. 371 National Stage Patent Application of International Application No. PCT/CN2021/127515, filed Oct. 29, 2021, which claims priority to Chinese application 202110798145.0, filed Jul. 15, 2021, each of which is hereby incorporated by reference in its entirety.

TECHNICAL FIELD

The embodiments of the present disclosure relate to the field of storage technology, in particular to a method and apparatus for writing data from an Advanced extensible Interface (AXI) bus to an On-chip Peripheral Bus (OPB), a method and apparatus for reading the data from the AXI bus to the OPB, an electronic device, and a non-transitory computer-readable storage medium.

BACKGROUND

With the continuous development of large-scale Integrated Circuits (IC), design methods of the ICs are gradually being optimized, among which the reuse of Intellectual Property (IP) resources may improve the efficiency and reliability of a System On Chip (SOC), save design costs and shorten the cycle of coming into the market.

An AXI bus may meet the requirements of the new generation of the SOC for high performance and low power consumption, and has been widely used. An OPB is widely used in the field of information, especially for providing a link between a processor core and other peripherals. During chip design and development, mature IP based on an OPB protocol often needs to be used in an AXI bus system, but when data interaction between the AXI bus and OPB is performed, designing and verifying these IP again will take a lot of time and labor costs and reduce the project development efficiency.

In summary, how to effectively solve the problem that the existing data interaction between the AXI bus and the OPB needs redesign and verification work, which will take a lot of time and labor costs and reduce the project development efficiency, is a problem urgently to be solved by those skilled in the art at present.

SUMMARY

In order to solve the above technical problems, the embodiments of the present disclosure provide the following technical solutions.

A method for writing data from an AXI bus to an OPB includes the following operations:
AXI write data sent by the AXI bus is received;
the AXI write data is stored into an AXI write cache;
timing conversion from an AXI bus protocol to an OPB protocol is performed on the AXI write data to obtain OPB write data;
the OPB write data is exported from the AXI write cache to the OPB.

In some embodiments of the present disclosure, the operation that timing conversion from the AXI bus protocol to the OPB protocol is performed on the AXI write data includes the following operations:

write attribute information of the AXI write data is acquired;
the write attribute information and the AXI write data are converted from being valid in two successive cycles to being valid in a same cycle.

In some embodiments of the present disclosure, before the OPB write data is exported from the AXI write cache to the OPB, the method further includes the following operation:
an AXI write address signal is received;
the operation that the AXI write data is stored into the AXI write cache includes the following operation:
the AXI write data and the AXI write address signal are stored into the AXI write cache;
the operation that the OPB write data is exported from the AXI write cache to the OPB includes the following operations:
a target write slave device in the OPB is determined according to the AXI write address signal;
the OPB write data is exported from the AXI write cache to the target write slave device in the OPB.

In some embodiments of the present disclosure, after the OPB write data is exported from the AXI write cache to the OPB, the method further includes the following operations:
an OPB write response signal returned by the OPB is received;
the OPB write response signal is stored into an OPB cache;
timing conversion from the OPB protocol to the AXI bus protocol is performed on the OPB write response signal to obtain an AXI write response signal;
the AXI write response signal is exported from the OPB cache to the AXI bus.

In some embodiments of the present disclosure, the operation that timing conversion from the OPB protocol to the AXI bus protocol is performed on the OPB write response signal to obtain the AXI write response signal includes the following operations:
validity statistics is performed on each OPB write response signal in the OPB cache to obtain a validity statistical result;
the AXI write response signal is obtained by calculation according to the validity statistical result.

A method for reading data from an AXI Bus to an OPB includes the following operations:
each AXI read instruction sent by the AXI bus is received;
each AXI read instruction is stored into an AXI read cache;
each AXI read instruction is sequentially exported from the AXI read cache to the OPB.

In some embodiments of the present disclosure, before each AXI read instruction is sequentially exported from the AXI read cache to the OPB, the method further includes the following operation:
an AXI read address signal is received;
the operation that each AXI read instruction is stored into the AXI read cache includes the following operation:
each AXI read instruction and the AXI read address signal are stored into the AXI read cache;
the operation that each AXI read instruction is sequentially exported from the AXI read cache to the OPB includes the following operations:
a target read slave device in the OPB is determined according to the AXI read address signal;
each AXI read instruction is sequentially exported from the AXI read cache to the target read slave device in the OPB.

In some embodiments of the present disclosure, after each AXI read instruction is sequentially exported from the AXI read cache to the OPB, the method further includes the following operations:

each piece of OPB read data returned by the OPB is received;

each piece of the OPB read data is stored into the OPB cache;

timing conversion from an OPB protocol to an AXI bus protocol is performed on each piece of the OPB read data to obtain AXI read data;

the AXI read data is exported from the OPB cache to the AXI bus.

In some embodiments of the present disclosure, the operation that timing conversion from the OPB protocol to the AXI bus protocol is performed on each piece of the OPB read data includes the following operations:

a number of instructions of each AXI read instruction is counted to obtain a total number of instructions;

it is determined that whether a number of each piece of the OPB read data obtained by caching reaches the total number of instructions;

in response to that the number of each piece of the OPB read data obtained by caching reaches the total number of instructions, each piece of the OPB read data is converted into AXI read data being valid in a same cycle.

An apparatus for writing data from an AXI Bus to an OPB includes:

a write data receiving component is configured to receive AXI write data sent by the AXI bus;

a write data storage component is configured to store the AXI write data into an AXI write cache;

a first timing sequence conversion component is configured to perform timing conversion from an AXI bus protocol to an OPB protocol on the AXI write data to obtain OPB write data;

a write data export component is configured to export the OPB write data from the AXI write cache to the OPB.

An apparatus for reading data from an AXI Bus to an OPB includes:

a read instruction receiving component is configured to receive each AXI read instruction sent by the AXI bus;

a read instruction storage component is configured to store each AXI read instruction into an AXI read cache.

a read instruction export component is configured to sequentially export each AXI read instruction from the AXI read cache to the OPB.

An electronic device includes a memory and a processor;

the memory is configured to store a computer program;

the processor is configured to implement the steps of the method for writing the data from the AXI bus to the OPB or the method for reading the data from the AXI bus to the OPB as described above when executing the computer program.

The embodiments of the present disclosure provide a non-transitory computer-readable storage medium. A computer program is stored on the non-transitory computer-readable storage medium, and the computer program, when executed by a processor, implements the steps of the method for writing the data from the AXI bus to the OPB or the method for reading the data from the AXI bus to the OPB as described above.

According to the method for writing the data from the AXI bus to the OPB provided by the embodiments of the present disclosure, the AXI write data sent by the AXI bus is received, the AXI write data is stored into the AXI write cache, timing conversion from the AXI bus protocol to the OPB protocol is performed on the AXI write data to obtain the OPB write data, and the OPB write data is exported from the AXI write cache to the OPB.

Accordingly, the embodiments of the present disclosure also provide the apparatus for writing the data from the AXI bus to the OPB, the method and apparatus for reading the data from the AXI bus to the OPB, the device, and the non-transitory computer-readable storage medium corresponding to the above method for writing the data from the AXI bus to the OPB.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings described below are only some embodiments of the present disclosure. Other drawings may further be obtained by those of ordinary skill in the art according to these drawings without creative efforts.

DETAILED DESCRIPTION OF THE EMBODIMENTS

In order to make the solutions of the embodiments of the present disclosure understood by those skilled in the art, the embodiments of the present disclosure will be described below in detail in combination with the drawings and the specific implementation modes. It is apparent that the described embodiments are only a part of the embodiments of the present disclosure, and not all of them. All other embodiments obtained by those of ordinary skill in the art based on the embodiments of the present disclosure without creative efforts are within the scope of protection of the embodiments of the present disclosure.

Figure 1:
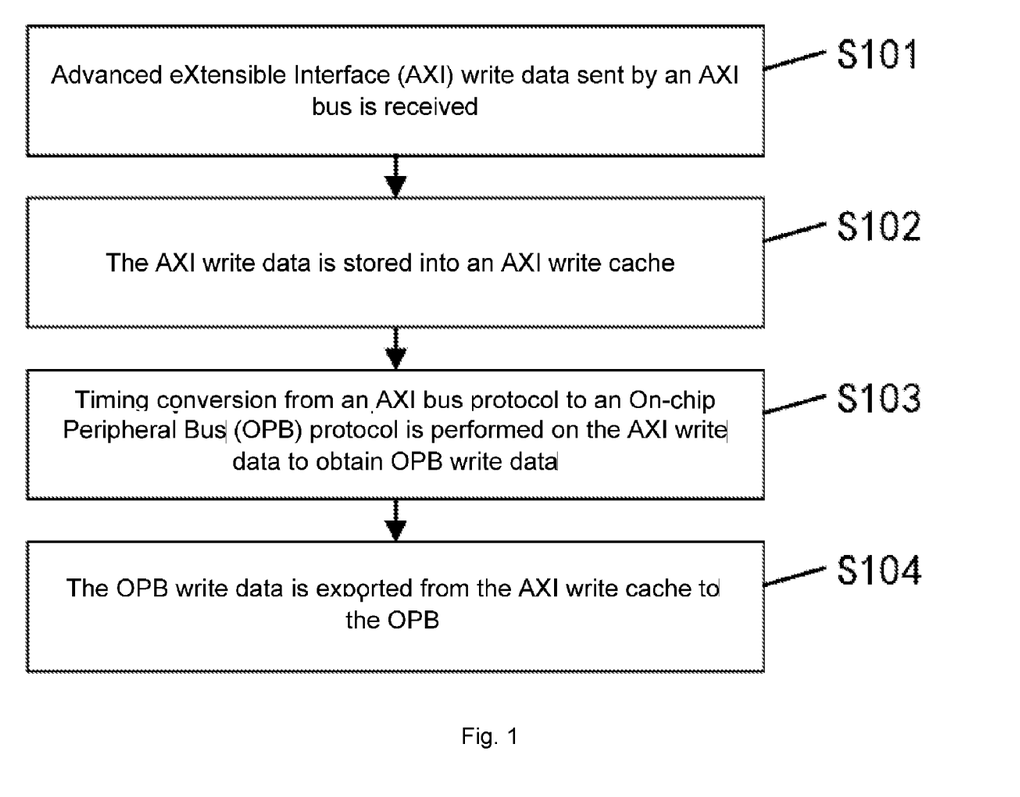
FIG. 1 is an implementation flowchart of a method for writing data from an AXI bus to an OPB according to the embodiments of the present disclosure.

Referring to FIG. 1, FIG. 1 is an implementation flowchart of a method for writing data from an AXI bus to an OPB according to the embodiments of the present disclosure. The method may include the following steps:

S101, AXI write data sent by the AXI bus is received.

A bridge apparatus is provided between the AXI bus connected to a master device and the OPB connected to each slave device in advance. When the master device on the AXI bus end needs to write the data to the slave device on the OPB end, the AXI write data is sent to the bridge apparatus.

The AXI write data is any data that needs to be written to the slave device on the OPB end, and the data is data that complies with an AXI bus protocol.

S102, the AXI write data is stored into an AXI write cache.

The bridge apparatus contains the AXI write cache for caching the AXI write data sent by the AXI bus. The bridge apparatus stores the AXI write data into the AXI write cache after receiving the AXI write data sent by the AXI bus.

When a write instruction is transferred on the AXI bus, a write address signal, write address valid, a write address Identity (ID), a burst length, a burst size, a burst type, and other information on the bus are valid in a same cycle, and the write data signal includes write data, write data valid, the last burst and other signals, which are valid in a next cycle. In the requirements for OPB timing, all signals related write instruction must be valid in one cycle, so that the AXI write cache is essential. At the same time, in order to improve the efficiency of the AXI bus, the bus supports an outstanding transaction, that is, a plurality of instructions may be sent continuously, so that the AXI write cache plays a crucial role in a process of writing the AXI write data from the master device in the AXI bus to the slave device in the OPB.

S103, timing conversion from an AXI bus protocol to an OPB protocol is performed on the AXI write data to obtain OPB write data.

The bridge apparatus contains a timing conversion component from the AXI bus protocol to the OPB protocol, which is configured to perform, after storing the AXI write data into the AXI write cache, timing conversion from the AXI bus protocol to the OPB protocol on the AXI write data to obtain the OPB write data. The conversion of the AXI write data satisfying the AXI bus protocol to the OPB write data satisfying the OPB protocol is thereby achieved.

S104, the OPB write data is exported from the AXI write cache to the OPB.

After obtaining the OPB write data satisfying the OPB protocol, the OPB write data is exported from the AXI write cache to the OPB, and the OPB write data is written to the slave device in the OPB, thereby completing the writing of the data of the master device in the AXI bus to the slave device in the OPB. On the basis of keeping original an Internet Protocol (IP) based on an AXI bus interface and an IP based on an OPB interface unchanged, the above IPs may be quickly and efficiently integrated into an SOC through data caching and timing conversion, so that the development speed of the whole system is improved on the basis of reducing the risk of redesign and verification, thereby further improving the competitiveness of products.

From the above technical solutions, the AXI write cache is preset, when a master device in the AXI bus needs to write the data to a slave device in the OPB, the AXI write cache is firstly used to cache the AXI write data, and timing conversion from the AXI bus protocol to the OPB protocol is performed, so as to obtain the OPB write data complying with the OPB protocol, and the OPB write data is exported from the AXI write cache to the OPB. Therefore, on the basis of not changing IP of the AXI bus and the OPB, through data caching and timing conversion, the conversion of the write data from the AXI bus protocol to the OPB protocol is achieved, and the data interaction between the AXI bus and the OPB is completed, which reduces costs and improves the project development efficiency.

It is to be noted that the embodiments of the present disclosure also provide a corresponding improvement solution based on the above embodiment. The same steps or corresponding steps as those in the above embodiment may be referred to each other in the subsequent embodiments, and corresponding beneficial effects may be referred to each other, which will not be elaborated in the following modified embodiments.

Figure 2:
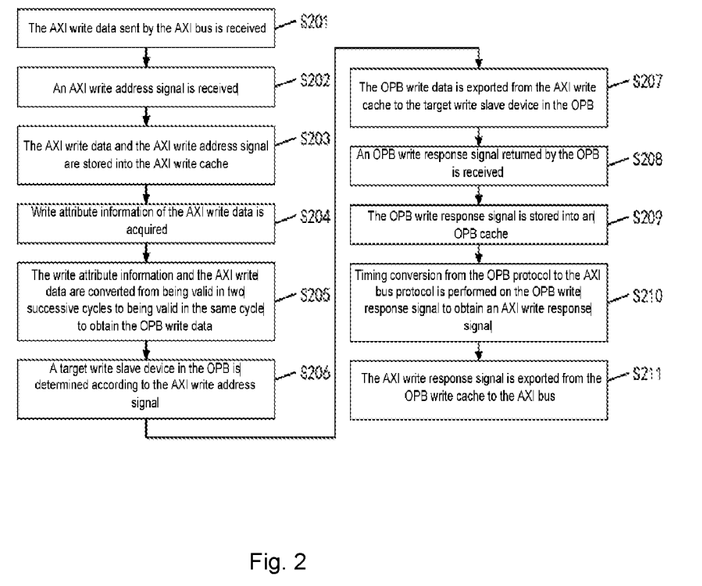
FIG. 2 is another implementation flowchart of a method for writing data from an AXI bus to an OPB according to the embodiments of the present disclosure.

Referring to FIG. 2, FIG. 2 is another implementation flowchart of a method for writing data from an AXI bus to an OPB according to the embodiments of the present disclosure. The method may include the following steps:

S201, AXI write data sent by the AXI bus is received.

S202, an AXI write address signal is received.

Figure 3:
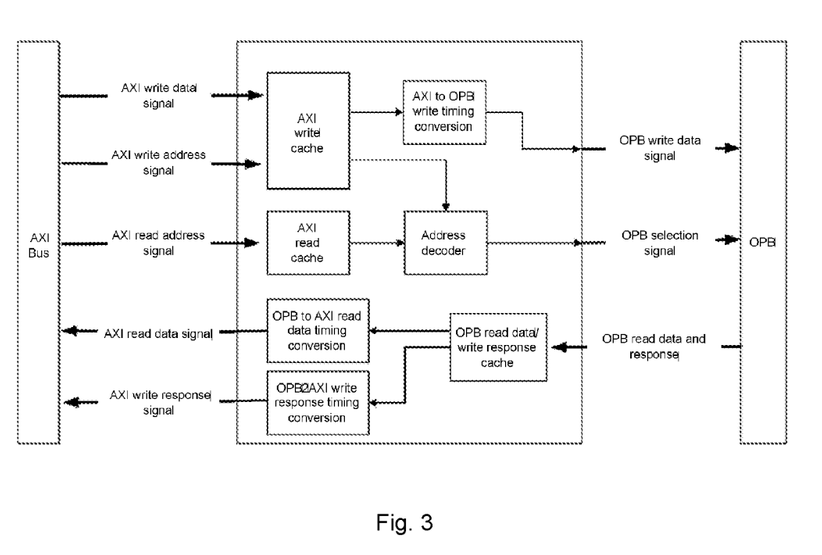
FIG. 3 is an implementation block diagram of data interaction between an AXI bus and an OPB according to the embodiments of the present disclosure.

Referring to FIG. 3, FIG. 3 is an implementation block diagram of data interaction between an AXI bus and an OPB according to the embodiments of the present disclosure. In addition to sending the AXI write data to a bridge apparatus, a master device on the AXI bus end may also send the AXI write address signal to the bridge apparatus, and the bridge apparatus receives the AXI write address signal. The AXI write address signal contains address information that needs to be written to the OPB, and the address information is a signal that complies with an AXI bus protocol.

It is to be noted that the embodiments of the present disclosure do not limit the execution sequence of S201 and S202, which may be executed sequentially or in parallel.

S203, the AXI write data and the AXI write address signal are stored into an AXI write cache.

After the AXI write data and AXI write address signal are received, the AXI write data and the AXI write address signal are stored into the AXI write cache.

S204, write attribute information of the AXI write data is acquired.

When a write instruction is transferred on the AXI bus, a write address signal, write address valid, a write address ID, a burst length, a burst size, a burst type, and other write attribute information on the AXI bus are valid in a same cycle, and the write data signal includes write data, write data valid, a last burst, and other signals, which are valid in a next cycle. The write attribute information of the AXI write data is acquired.

S205, the write attribute information and the AXI write data are converted from being valid in two successive cycles to being valid in a same cycle to obtain OPB write data.

In the requirements for OPB timing, all signals related write instruction must be valid in one cycle. Therefore, after the write attribute information of the AXI write data is acquired, the write attribute information and the AXI write data are converted from being valid in two successive cycles to being valid in a same cycle to obtain the OPB write data.

The provisions of an AXI bus protocol and an OPB protocol are different. The OPB protocol requires each piece of write data to have an address corresponding thereto, while the AXI bus protocol supports three different burst modes, and has a conversion relationship with the OPB protocol as follows, involving the AXI write address signal, the write address valid, the write address ID, the burst length, the burst size, the burst type, and other signals:

a) FIXED (fixed address): OPB_ADDR=m_axi_awaddr

In this mode, two address signals are directly connected together.

b) INCR (incremental): OPB_ADDR=m_axi_awaddr+ add_addr

A head address of the OPB is the same as the AXI address, and subsequent addresses need to be incremented on the basis of the initial address by the same increment as the transmission width.

c) WRAP (wrap incremental): firstly, a wrap width is calculated according to the actual burst length and a burst data width of the AXI: wrap_size=burst_len*burst_size;

where wrap_size is the wrap width; burst_len is the actual burst length; burst_size is a data size of each burst, and the unit of the data size is Byte.

Secondly, a low wrap boundary is calculated:

Temp0=$m$_axi_awaddr/wrap_siz, only taking the integer part.

Temp0 is an intermediate variable of a calculation process; and m_axi_awaddr is the AXI write address.

low wrap boundary=Temp0*wrap_size.

Thirdly, a high wrap boundary is calculated:

high wrap boundary=low wrap boundary+wrap_size.

Finally, an address corresponding to each piece of data is calculated.

When the current address is less than the high wrap boundary, the WRAP and INCR types are exactly the same, and the address is incremented. However, after the incremented address reaches the highest address, the address directly returns to the lower wrap boundary, and then is incremented, and so on.

In a same cycle of converting the write address into the OPB address, it is necessary to synchronously convert the write data into a format of the OPB write data, and directly assign the AXI write data to the OPB write data in turn during processing.

Through the write timing conversion from the AXI bus to the OPB, a signal of the AXI write cache is received and converted into address, data, write control, byte enable and other signals complying with the OPB protocol.

S206, a target write slave device in the OPB is determined according to the AXI write address signal.

After receiving the AXI write address signal and obtaining the OPB write data through timing conversion, the target write slave device in the OPB is determined according to the AXI write address signal.

During system initialization configuration, an address space of each slave device on the OPB has been allocated, so that by comparing the AXI write address signal with the allocated address space, it is determined to which slave device on the OPB the master device of the AXI bus currently needs to write data.

S207, the OPB write data is exported from the AXI write cache to the target write slave device in the OPB.

After the target write slave device in the OPB is determined, the OPB write data is exported from the AXI write cache to the target write slave device in the OPB, so that data to be written is accurately written, thereby improving the data writing efficiency and writing accuracy.

S208, an OPB write response signal returned by the OPB is received.

After receiving the OPB write data, the target write slave device in the OPB generates the OPB write response signal configured to identify whether the data is successfully written, and returns the OPB write response signal to the bridge apparatus through the OPB. The bridge apparatus receives the OPB write response signal returned by the OPB.

S209, the OPB write response signal is stored into an OPB cache.

The OPB cache is provided in the bridge apparatus, and after receiving the OPB write response signal, the bridge apparatus stores the OPB write response signal into the OPB cache.

A selection signal configured to indicate whether information that needs to be returned to the AXI bus exists in the OPB cache is preset. The OPB cache firstly determines whether valid information that needs to be returned to the AXI bus exists according to the selection signal of the OPB, and in response to that valid information that needs to be returned to the AXI bus exist, response, retransmission, error, read data, and other information from the OPB are cached.

S210, timing conversion from the OPB protocol to the AXI bus protocol is performed on the OPB write response signal to obtain an AXI write response signal.

After storing the OPB write response signal into the OPB cache, timing conversion from the OPB protocol to the AXI bus protocol is performed on the OPB write response signal, so as to obtain the AXI write response signal complying with the AXI bus protocol.

In some embodiments of the present disclosure, S210 may include the following two steps:

Step 1, validity statistics is performed on each OPB write response signal in the OPB cache to obtain a validity statistical result.

Step 2, the AXI write response signal is obtained by calculation according to the validity statistical result.

For ease of description, the above two steps may be combined for explanation.

Validity statistics is performed on each OPB write response signal in the OPB cache to obtain the validity statistical result, and the AXI write response signal is obtained by calculation according to the validity statistical result.

A write response status signal and a write response signal for a valid write response contained in an AXI write response channel are flag signals showing a complete AXI write operation, which requires that all data of a burst write operation is validly written to the responding slave device.

In the OPB protocol, the essence of OPB_FWACK, OPB_HWACK, OPB_RETRY and OPB_XFEACK is to express whether the transmission is completed, but only represents whether the data of one clock cycle is successfully written, so that during the conversion of the write response signal, it is necessary to record and calculate the status of each response signal of the OPB. When the response signals returned by all the data of one AXI write burst on the OPB are valid, it is considered that this AXI write burst process is valid, a responsive AXI write response valid signal is returned, otherwise an invalid or error signal is returned, referring to Table 1 for details.

TABLE 1

| OPB_fer | OPB_errAck number | Sln_errAck number | m_axi_bresp[1:0] |
|---|---|---|---|
| 1 | 0 | 0 | 00 |
| 1 | OPB_errAck>0 | 0 | 11 |
| 1 | 0 | Sln_errAck>0 | 11 |
| 1 | OPB_errAck>0 | Sln_errAck>0 | 11 |
| 0 | 0 | 0 | 11 |
| 0 | OPB_errAck>0 | 0 | 11 |
| 0 | 0 | Sln_errAck>0 | 11 |
| 0 | OPB_errAck>0 | Sln_errAck>0 | 11 |

S211, the AXI write response signal is exported from the OPB write cache to the AXI bus.

After the AXI write response signal is obtained, the AXI write response signal is exported from the OPB cache to the AXI bus, so that the information response of the slave device in the OPB to the master device in the AXI bus is completed. By adding a bridging apparatus, an AXI bus interface component and an OPB interface component are directly connected, which greatly reduces the development time, improves the efficiency and reliability of an SOC, and saves design costs.

Figure 4:
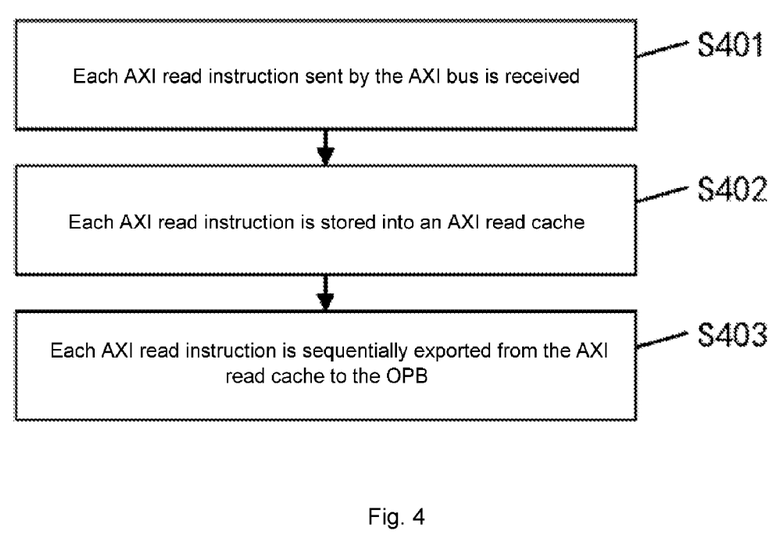
FIG. 4 is an implementation flowchart of a method for reading data from an AXI bus to an OPB according to the embodiments of the present disclosure.

Referring to FIG. 4, FIG. 4 is an implementation flowchart of a method for reading data from an AXI bus to an OPB according to the embodiments of the present disclosure. The method may include the following steps:

S401, each AXI read instruction sent by the AXI bus is received.

When a master device on the AXI bus end needs to read the data from a slave device on the OPB end, the AXI read instruction corresponding to each data block to be read is generated, and each AXI read instruction is sent to a bridge apparatus. The bridge apparatus receives each AXI read instruction sent by the AXI bus.

S402, each AXI read instruction is stored into an AXI read cache.

The bridge apparatus contains the AXI read cache for caching each AXI read instruction sent by the AXI bus. The bridge apparatus stores each AXI read instruction into the AXI read cache after receiving each AXI read instruction sent by the AXI bus.

When a read instruction is transferred on the AXI bus, a read address signal, read address valid, a read address ID, a burst length, a burst size, a burst type, and other information on the bus are valid in a same cycle. When the number of burst read data of the instruction is greater than 1, the slave device needs a plurality of cycles to return data. However, the AXI bus supports an outstanding transaction, when being sent continuously, a plurality of read instructions need to be sequentially cached and then sequentially sent to the OPB, so that when the master device in the AXI bus reads the data from the slave device in the OPB, the AXI read cache plays a crucial role.

S403, each AXI read instruction is sequentially exported from the AXI read cache to the OPB.

After each AXI read instruction is stored into the AXI read cache, each AXI read instruction is sequentially exported from the AXI read cache to the OPB.

Figure 5:
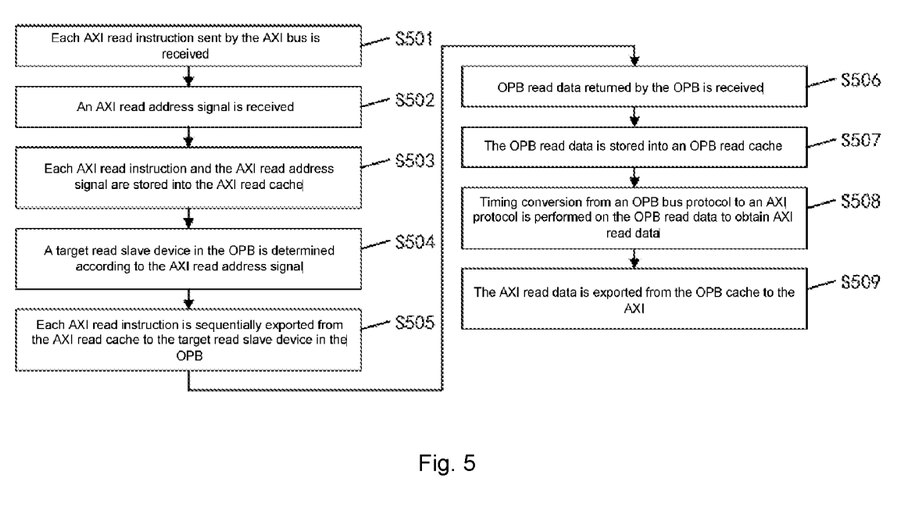
FIG. 5 is another implementation flowchart of a method for reading data from an AXI bus to an OPB according to the embodiments of the present disclosure.

Referring to FIG. 5, FIG. 5 is another implementation flowchart of a method for reading data from an AXI bus to an OPB according to the embodiments of the present disclosure. The method may include the following steps:

S501, each AXI read instruction sent by the AXI bus is received.

S502, an AXI read address signal is received.

In addition to sending each AXI read instruction to a bridge apparatus, a master device on the AXI bus end may also send the AXI read address signal to the bridge apparatus, and the bridge apparatus receives the AXI read address signal. The AXI read address signal contains address information to be read of a slave device in the OPB.

S503, each AXI read instruction and the AXI read address signal are stored into the AXI read cache.

After each AXI read instruction and the AXI read address signal are received, each AXI read instruction and the AXI read address signal are stored into the AXI read cache.

S504, a target read slave device in the OPB is determined according to the AXI read address signal.

After receiving the AXI read address signal, the target read slave device in the OPB is determined according to the AXI read address signal.

S505, each AXI read instruction is sequentially exported from the AXI read cache to the target read slave device in the OPB.

After the target read slave device in the OPB is determined, each AXI read instruction is sequentially exported from the AXI read cache to the target read slave device in the OPB. Therefore, data to be read is accurately read, and the data reading efficiency and the reading accuracy are improved.

S506, OPB read data returned by the OPB is received.

After receiving the corresponding AXI read instruction, the slave device in the OPB returns the OPB read data to the bridge apparatus according to the read instruction, and the bridge apparatus receives the OPB read data returned by the OPB.

S507, the OPB read data is stored into an OPB read cache.

The bridge apparatus stores the OPB read data into the OPB read cache after receiving the OPB read data.

S508, timing conversion from an OPB bus protocol to an AXI protocol is performed on the OPB read data to obtain AXI read data.

In some embodiments of the present disclosure, S508 may include the following three steps:

Step 1, a number of instructions of each AXI read instruction is counted to obtain a total number of instructions.

Step 2, it is determined that whether a number of each piece of the OPB read data obtained by caching reaches the total number of instructions. In response to that the number of the OPB read data obtained by caching reaches the total number of instructions, S3 is executed, and in response to that the number of the OPB read data obtained by caching does not reach the total number of instructions, a wait is continued for caching the OPB read data.

Step 3, each piece of the OPB read data is converted to the AXI read data being valid in a same cycle.

For ease of description, the above three steps may be combined for explanation.

The number of instructions of each AXI read instruction is counted to obtain the total number of instructions, it is determined that whether the number of each piece of the OPB read data obtained by caching reaches the total number of instructions, in response to that the number of the OPB read data obtained by caching reaches the total number of instructions, it indicates that each piece of the OPB read data is cached, and in response to that the number of the OPB read data obtained by caching does not reach the total number of instructions, it indicates that each piece of the OPB read data is not cached, a wait is continued for caching the OPB read data, and each piece of the OPB read data is converted to the AXI read data being valid in a same cycle.

After the OPB read data is stored into the OPB cache, timing conversion from the OPB protocol to the AXI bus protocol is performed on the OPB read data, so as to obtain the AXI read data complying with the AXI bus protocol.

An AXI read data channel generally requires data continuity, so that when a timing of the OPB read data is converted into the AXI, firstly according to the number of bursts of the read data, it is determined that whether all the data of a burst read request is returned, and is cached in the OPB cache. When the data is completely returned, the data is sequentially read from the OPB cache, valid data, last set of data flag, read channel ID, and other signals are added and are together converted into a standard timing of the AXI, and in response to that the data is not completely returned, a wait is continued until the data is completely returned. A conversion relationship of valid data is as shown in Table 2, where m_axi_rdata is an OR operation result of OPB_hwxfer, OPB_fwxfer and OPB_dwxfer, that is, only when the three are simultaneously 0, m_axi_rdata is 0, otherwise 1.

TABLE 2

| OPB_hwxfer | OPB_fwxfer | OPB_dwxfer | m_axi_rdata |
|---|---|---|---|
| 0 | 0 | 0 | 0 |
| 1 | 0 | 0 | {4{OPB_RDATA[31:24]}} |
| 1 | 1 | 0 | {2{OPB_RDATA[31:16]}} |
| 1 | 1 | 1 | OPB_RDATA[31:0] |

S509, the AXI write data is exported from the OPB cache to the AXI.

After the AXI read data is obtained, the AXI write response signal is exported from the OPB cache to the AXI bus, so that the reading of data in the slave device on the OPB end by the master device on the AXI bus end is completed.

Corresponding to the above method embodiments of the method for writing the data from the AXI bus to the OPB, the embodiments of the present disclosure also provide an apparatus for writing the data from the AXI bus to the OPB, and the apparatus for writing the data from the AXI bus to the OPB described below and the method for writing the data from the AXI bus to the OPB described above are referred to correspondingly.

Figure 6:
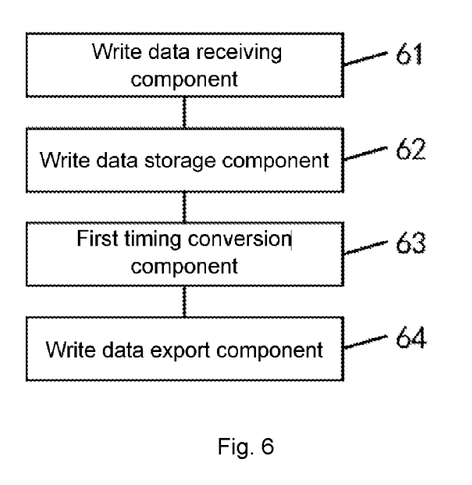
FIG. 6 is a structure diagram of an apparatus for writing data from an AXI bus to an OPB according to the embodiments of the present disclosure.

Referring to FIG. 6, FIG. 6 is a structure diagram of an apparatus for writing data from an AXI bus to an OPB according to the embodiments of the present disclosure. The apparatus may include:

a write data receiving component 61 is configured to receive AXI write data sent by the AXI bus;

a write data storage component 62 is configured to store the AXI write data into an AXI write cache;

a first timing sequence conversion component 63 is configured to perform timing conversion from an AXI bus protocol to an OPB protocol on the AXI write data to obtain OPB write data.

a write data export component 64 is configured to export the OPB write data from the AXI write cache to the OPB.

From the above technical solutions, the AXI write cache is preset, when a master device in the AXI bus needs to write the data to a slave device in the OPB, the AXI write cache is firstly used to cache the AXI write data, and timing conversion from the AXI bus protocol to the OPB protocol is performed, so as to obtain the OPB write data complying with the OPB protocol, and the OPB write data is exported from the AXI write cache to the OPB. Therefore, on the basis of not changing IP of the AXI bus and the OPB, through data caching and timing conversion, the conversion of the write data from the AXI bus protocol to the OPB protocol is achieved, and the data interaction between the AXI bus and the OPB is completed, which reduces costs and improves the project development efficiency.

In some embodiments of the present disclosure, the first timing sequence conversion component 63 includes:

a write data information acquisition sub-component is configured to acquire write attribute information of the AXI write data.

a first cycle valid conversion acquisition sub-component is configured to convert write attribute information and the AXI write data from being valid in two successive cycles to being valid in a same cycle.

In some embodiments of the present disclosure, the apparatus may further include:

a write address information receiving component is configured to receive an AXI write address signal before exporting the OPB write data from the AXI write cache to the OPB.

The write data storage component 62 is configured to store the AXI write data and the AXI write address signal into the AXI write cache.

The write data export component 64 includes:

a write slave device determination sub-component is configured to determine a target write slave device in the OPB according to the AXI write address signal;

a write data export sub-component is configured to export the OPB write data from the AXI write cache to the target write slave device in the OPB.

In some embodiments of the present disclosure, the apparatus may further include:

a write response signal receiving component is configured to receive an OPB write response signal returned by the OPB after exporting the OPB write data from the AXI write cache to the OPB;

a write response signal storage component is configured to store the OPB write response signal into an OPB cache;

a second timing sequence conversion component is configured to perform timing conversion from the OPB protocol to the AXI bus protocol on the OPB write response signal to obtain an AXI write response signal;

a write response signal export component is configured to export the AXI write response signal from the OPB write cache to the AXI bus.

In some embodiments of the present disclosure, the second timing sequence conversion component includes:

a signal validity statistics sub-component is configured to perform validity statistics on each OPB write response signal in the OPB cache to obtain a validity statistical result;

an AXI write response signal calculation sub-component is configured to obtain the AXI write response signal by calculation according to the validity statistical result.

Corresponding to the above method embodiments of the method for reading the data from the AXI bus to the OPB, the embodiments of the present disclosure also provide an apparatus for reading the data from the AXI bus to the OPB, and the apparatus for reading the data from the AXI bus to the OPB described below and the method for reading the data from the AXI bus to the OPB described above are referred to correspondingly.

Figure 7:
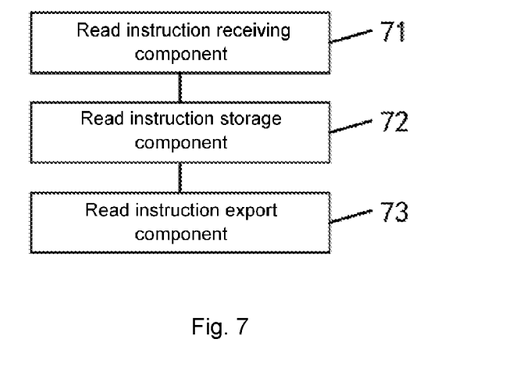
FIG. 7 is a structure diagram of an apparatus for reading data from an AXI bus to an OPB according to the embodiments of the present disclosure.

Referring to FIG. 7, FIG. 7 is a structure diagram of an apparatus for reading data from an AXI bus to an OPB according to the embodiments of the present disclosure. The apparatus may include:

a read instruction receiving component 71 is configured to receive each AXI read instruction sent by the AXI bus;

a read instruction storage component 72 is configured to store each AXI read instruction into an AXI read cache.

a read instruction export component 73 is configured to sequentially export each AXI read instruction from the AXI read cache to the OPB.

In some embodiments of the present disclosure, the apparatus may further include:

a read address signal receiving component is configured to receive an AXI read address signal before sequentially exporting each AXI read instruction from the AXI read cache to the OPB.

The read instruction storage component is configured to store each AXI read instruction and the AXI read address signal into the AXI read cache.

The read instruction export component 73 includes:

a read slave device determination sub-component is configured to determine a target read slave device in the OPB according to the AXI read address signal;

a read instruction export sub-component is configured to sequentially export each AXI read instruction from the AXI read cache to the target read slave device in the OPB.

In some embodiments of the present disclosure, the apparatus may further include:

a read data receiving component is configured to receive OPB read data returned by the OPB after sequentially exporting each AXI read instruction from the AXI read cache to the OPB;

a read data caching component is configured to store the OPB read data into the OPB cache;

a third timing conversion component is configured to perform timing conversion from an OPB protocol to an AXI bus protocol on the OPB read data to obtain AXI read data;

a read data export component is configured to export the AXI read data from the OPB cache to the AXI bus.

In some embodiments of the present disclosure, the third timing sequence conversion component includes:

an instruction number statistics sub-component is configured to count a number of instructions of each AXI read instruction to obtain a total number of instructions;

a determination sub-component is configured to determine whether a number of each piece of the OPB read data obtained by caching reaches the total number of instructions;

a second cycle valid conversion sub-component is configured to convert each piece of the OPB read data into AXI read data being valid in a same cycle when the number of each piece of the OPB read data obtained by caching is determined to reach the total number of instructions.

Figure 8:
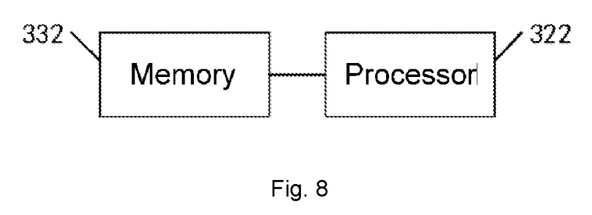
FIG. 8 is a structure diagram of an electronic device according to the embodiments of the present disclosure.

Corresponding to the above method embodiments, referring to FIG. 8, FIG. 8 is a schematic diagram of an electronic device according to the embodiments of the present disclosure. The device may include:

a memory 332 is configured to store a computer program;

a processor 322 is configured to implement the steps of the method for writing the data from the AXI bus to the OPB or the method for reading the data from the AXI bus to the OPB of the above method embodiments when executing the computer program.

Referring to FIG. 5, FIG. 5 is a specific schematic structural diagram of an electronic device according to the embodiments of the present disclosure. The electronic device may vary widely depending on configuration or performance, and may include one or more processors (Central Processing Units (CPUs)) 322 (such as one or more processors) and the memory 332. The memory 332 stores one or more computer applications 342 or data 344. The memory 332 may be a transient storage or persistent storage. A program stored in the memory 332 may include one or more components (not shown), each of which may include a series of instruction operations on a data processing device. Further, the processor 322 may be configured to communicate with the memory 332 to execute a series of instruction operations in the memory 332 on the electronic device 301.

Figure 9:
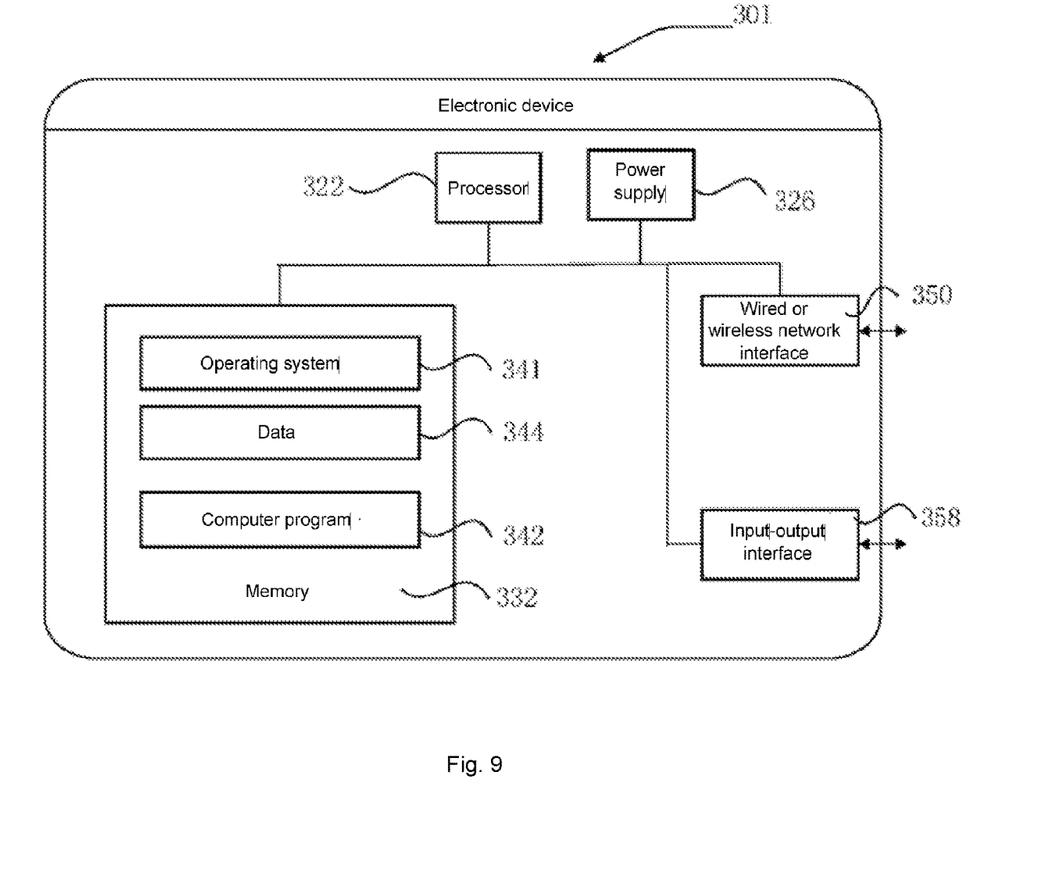
FIG. 9 is a specific schematic structural diagram of an electronic device according to the embodiments of the present disclosure.

The electronic device 301 may further include one or more power supplies 326, one or more wired or wireless network interfaces 350, one or more input-output interfaces 358, and/or one or more operating systems 341.

The steps of the method for writing the data from the AXI bus to the OPB or the method for reading the data from the AXI bus to the OPB described above may be implemented by the structure of the electronic device.

Corresponding to the above method embodiments, the embodiments of the present disclosure also provide a non-transitory computer-readable storage medium. A computer program is stored on the non-transitory computer-readable storage medium. When executed by a processor, the computer program may implement the following steps:

AXI write data sent by an AXI bus is received; the AXI write data is stored into an AXI write cache; timing conversion from an AXI bus protocol to an OPB protocol is performed on the AXI write data to obtain OPB write data; and the OPB write data is exported from the AXI write cache to an OPB.

Or:

Each AXI read instruction sent by the AXI bus is received; each AXI read instruction is stored into an AXI read cache; and each AXI read instruction is sequentially exported from the AXI read cache to the OPB.

The non-transitory computer-readable storage medium includes: various media capable of storing program codes such as a U disk, a mobile hard disk, a Read-Only Memory (ROM), a Random Access Memory) (RAM), a magnetic disk, or an optical disk.

The description of the non-transitory computer-readable storage medium provided in the embodiments of the present disclosure refers to the above method embodiments, which will not be elaborated here.

The various embodiments in the present specification are described in a progressive manner, and each embodiment focuses on differences from other embodiments, and the same or similar parts between the various embodiments may be referred to each other. For the apparatuses and methods, and the non-transitory computer-readable storage medium disclosed in the embodiments, since they correspond to the methods disclosed in the embodiment, the description is relatively simple, and the relevant parts may be referred to the method part.

The principles and implementation modes of the embodiments of the present disclosure are described herein using examples, the foregoing description of the embodiments are only used to help the understanding of the technical solutions and core concept of the embodiments of the present disclosure. It is to be noted that a number of improvements and modifications may be also made to the embodiments of the present disclosure by those of ordinary skill in the art without departing from the principle of the embodiments of the present disclosure, and all fall within the scope of protection of the claims of the embodiments of the present disclosure.

The invention claimed is:

1. A method for writing data from an Advanced extensible Interface (AXI) bus to an On-chip Peripheral Bus (OPB), comprising:
receiving AXI write data sent by the AXI bus;
storing the AXI write data into an AXI write cache;
acquiring write attribute information of the AXI write data;
converting the write attribute information and the AXI write data from being valid in two successive cycles to being valid in a same cycle to obtain OPB write data; and
exporting the OPB write data from the AXI write cache to the OPB;
the method further comprises:
receiving an OPB write response signal returned by the OPB;
storing the OPB write response signal into a OPB cache;
preforming validity statistics on each OPB write response signal in the OPB cache to obtain a validity statistical result; and
obtaining the AXI write response signal by calculation according to the validity statistical result;
exporting the AXI write response signal from the OPB cache to the AXI bus.

2. The method for writing the data from the AXI bus to the OPB as claimed in claim 1, wherein before exporting the OPB write data from the AXI write cache to the OPB, the method further comprises:
receiving an AXI write address signal;
the storing the AXI write data into the AXI write cache comprises:
storing the AXI write data and the AXI write address signal into the AXI write cache;
the exporting the OPB write data from the AXI write cache to the OPB comprises:
determining a target write slave device in the OPB according to the AXI write address signal; and
exporting the OPB write data from the AXI write cache to the target write slave device in the OPB.

3. A method for reading data from an Advanced extensible Interface (AXI) bus to an On-chip Peripheral Bus (OPB), comprising:
receiving each AXI read instruction sent by the AXI bus;
storing each AXI read instruction into an AXI read cache; and
sequentially exporting each AXI read instruction from the AXI read cache to the OPB;
the further comprises:
receiving each piece of OPB read data returned by the OPB;
storing each piece of the OPB read data into a OPB cache;
counting a number of instructions of each AXI read instruction to obtain a total number of instructions;
determining whether a number of the OPB read data obtained by caching reaches the total number of instructions; and
in response to that the number of OPB read data obtained by caching reaches the total number of instructions, converting each piece of the OPB read data into AXI read data being valid in a same cycle;
exporting the AXI read data from the OPB cache to the AXI bus.

4. The method for reading the data from the AXI bus to the OPB as claimed in claim 3, wherein before sequentially exporting each AXI read instruction from the AXI read cache to the OPB, the method further comprises:
receiving an AXI read address signal;
the storing each AXI read instruction into the AXI read cache comprises:
storing each AXI read instruction and the AXI read address signal into the AXI read cache;
the sequentially exporting each AXI read instruction from the AXI read cache to the OPB comprises:
determining a target read slave device in the OPB according to the AXI read address signal; and
sequentially export each AXI read instruction from the AXI read cache to the target read slave device in the OPB.

5. An electronic device, comprising:
a memory, configured to store a computer program; and
a processor, configured to perform the computer program to: receive AXI write data sent by an Advanced extensible Interface (AXI) bus; store the AXI write data into an AXI write cache; acquire write attribute information of the AXI write data; convert the write attribute information and the AXI write data from being valid in two successive cycles to being valid in a same cycle to obtain OPB write data; and export the OPB write data from the AXI write cache to an On-chip Peripheral Bus (OPB), receive an OPB write response signal returned by the OPB; store the OPB write response signal into an OPB cache; preform validity statistics on each OPB write response signal in the OPB cache to obtain a validity statistical result; and obtain the AXI write response signal by calculation according to the validity statistical result; export the AXI write response signal from the OPB cache to the AXI bus.

6. The method for writing the data from the AXI bus to the OPB as claimed in claim 1, wherein the AXI bus supports continuous sending a plurality of instructions.

7. The method for writing the data from the AXI bus to the OPB as claimed in claim 2, wherein determining the target write slave device in the OPB according to the AXI write address signal comprises:
determining the target write slave device according to comparing the AXI write address signal with a allocated address space of each slave device on the OPB.

8. The method for writing the data from the AXI bus to the OPB as claimed in claim 1, wherein before receiving the OPB write response signal returned by the OPB, the method further comprises:
after receiving the OPB write data, a target write slave device in the OPB generates the OPB write response signal configured to identify whether the OPB write data is successfully written.

9. The method for writing the data from the AXI bus to the OPB as claimed in claim 1, wherein before storing the OPB write response signal into the OPB cache, the method further comprises:
a selection signal configured to indicate whether information that needs to be returned to the AXI bus exists in the OPB cache is preset, and the OPB cache determines whether valid information that needs to be returned to the AXI bus exists according to the selection signal of the OPB.

10. The method for reading the data from the AXI bus to the OPB as claimed in claim 4, the method further comprising:

the AXI read address signal contains address information to be read of a slave device in the OPB.

11. The electronic device as claimed in claim 5, the processor is configured to perform the computer program to: receive an AXI write address signal; store the AXI write data and the AXI write address signal into the AXI write cache; determine a target write slave device in the OPB according to the AXI write address signal; and export the OPB write data from the AXI write cache to the target write slave device in the OPB.

* * * * *